US007004482B1

(12) United States Patent
Steffan

(10) Patent No.: US 7,004,482 B1
(45) Date of Patent: Feb. 28, 2006

(54) FOLDABLE GOLF-BAG/HARD-CART ASSEMBLY WITH MOUNTING ASSEMBLY HAVING RETROFIT CAPABILITY

(76) Inventor: Edward J. Steffan, 21 Lexington Ave., Hamburg, NY (US) 14075

( * ) Notice: Subject to any disclaimer, the term of this patent is extended or adjusted under 35 U.S.C. 154(b) by 0 days.

(21) Appl. No.: 10/614,304

(22) Filed: Jul. 5, 2003

(51) Int. Cl.
   *B62B 1/00* (2006.01)
(52) U.S. Cl. .............................. 280/47.17; 280/DIG. 5; 280/646
(58) Field of Classification Search ............. 280/47.17, 280/47.34, 63, 651, 652, 655, 659, 645, 646, 280/642, 639, DIG. 6; 248/96; 403/93, 403/253, 311
   See application file for complete search history.

(56) References Cited

U.S. PATENT DOCUMENTS

| 2,405,674 | A |   | 8/1946 | Schliwa et al. |
|---|---|---|---|---|
| 2,406,183 | A | * | 8/1946 | Allen .......................... 280/655 |
| 2,415,392 | A | * | 2/1947 | Morehouse ................. 280/646 |
| 2,647,762 | A | * | 8/1953 | Jamieson et al. .......... 280/646 |
| 2,854,244 | A | * | 9/1958 | Jarman ..................... 280/47.26 |
| 2,868,559 | A |   | 1/1959 | Vincelette |
| 2,914,336 | A | * | 11/1959 | Hibben, Jr. et al. .... 280/DIG. 6 |
| 3,051,505 | A | * | 8/1962 | Flanagan ............... 280/DIG. 6 |
| 3,459,434 | A | * | 8/1969 | Dulaney ................ 280/DIG. 6 |
| 3,580,533 | A | * | 5/1971 | Nordland ............... 280/DIG. 6 |
| 4,950,003 | A | * | 8/1990 | Holtz ......................... 280/655 |
| 5,029,883 | A |   | 7/1991 | Derito |
| 5,074,577 | A |   | 12/1991 | Kim |
| 5,112,068 | A | * | 5/1992 | Liao et al. ............. 280/DIG. 6 |
| 5,139,257 | A | * | 8/1992 | Wu ............................. 248/96 |
| 5,829,585 | A | * | 11/1998 | Kao et al. ..................... 248/96 |
| 6,068,270 | A |   | 5/2000 | Kim |
| 6,186,522 | B1 | * | 2/2001 | Weis ..................... 280/DIG. 6 |

* cited by examiner

*Primary Examiner*—Hau Phan
(74) *Attorney, Agent, or Firm*—Patricia M. Costanzo

(57) ABSTRACT

A foldable golf-bag transporting golf-bag/golf-cart assembly shaped to accommodate golf-bag with protruding storage compartments, providing for secure, reversible mounting of bag onto cart allowing bag to maintain a stable, vertical position when cart at rest, without need for straps or biasing members; having first and second mounting members shaped to reversibly mate in sliding dovetail manner attached to upper regions of bag and cart and having third and fourth mounting members shaped to reversibly mate with each other attached to lower regions of bag and cart. Mounting members available as retrofit members. Cart includes foldable handle and foldable platform attached to lower end of cart that when opened to horizontal position supports bag in vertical position. Cart's wheel axle may be telescoped outwardly providing stability while assembly in motion or in vertical rest position, or may be retracted inwardly to provide for transport through narrow passageways.

9 Claims, 10 Drawing Sheets

FOLDABLE GOLF-BAG/HARD-CART ASSEMBLY WITH MOUNTING ASSEMBLY HAVING RETROFIT CAPABILITY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND OF THE INVENTION

The present invention relates generally to golf-bags and golf carts and more particularly to a foldable golf cart/golf-bag assembly.

The background information discussed below is presented to better illustrate the novelty of the present invention. This background information is not admitted prior art.

Because of its historical ties to Scottish, English, and French monarchs, golf is referred to as a "royal and ancient" game. In the days of James IV, James V, and his daughter Mary Stuart, who it is said was seen playing golf just days after her husband was murdered, golf was considered a game for royalty. However, today the game of golf is played by persons from nearly all strata of society. Men and women, young and old play golf today. In fact, according to the National Golf Foundation, there are now nearly 27 million golfers, with about two million people taking up golf each year. People play golf for pleasure, networking, and exercise.

A game of golf offers maximum exercise benefits when the golfers walk the course, as opposed to riding in a motorized cart. Golf-bags containing clubs, balls, accessories, and other items useful or desired for the full enjoyment of the game, however, often end up weighing too much for most people, especially those with limited physical ability, to carry over the several miles that must be traversed while playing a typical eighteen hole game.

Some golfers will employ the services of a caddy to carry their golf-bags, if, indeed, their golf course offers such an amenity. Many golfers, however, feel that the expense of a caddy is a financial burden and are unable or reluctant to add this cost to the already high cost of playing the game. Thus, the need for a mobile golf-bag transport cart is obvious.

Wheeled golf-bag hand-carts constructed to receive golf-bags have been proposed. Unfortunately, these carts all present one or more drawbacks. Most carts require one or more straps to hold the golf-bag to the cart. Fitting a strap or straps around the golf-bag and cart to secure the bag to the cart is tedious and time consuming. The straps must first be threaded around the bag and cart and then the strap buckles must be clamped to secure the bag to the cart resulting in the golfer spending more time preparing for play and less time playing. It is obvious, therefore, that there is an unmet need in the art for a means to quickly, easily, and reversibly secure a golf-bag to a hand-cart.

Using straps to secure a golf-bag to a hand-cart presents additional problems. With use and age, straps lose their integrity and began to twist and fold against the load the golf-bag presents. Once this happens the golf-bag is no longer held tightly to the golf hand-cart causing the bag to turn and/or lean resulting in an uneven load making maneuvering the cart more difficult. Additionally, the straps most frequently used are routinely provided with the ubiquitous, plastic, insert-prong type of buckle. These brittle plastic buckles are prone to breakage and thus, must be replaced periodically presenting the golfer with yet another chore and another expense. Perhaps even more aggravating than having to periodically replace the strap buckle is the problem of trying to finish a game of golf while having to maneuver about the course with a bag and cart that are no longer securely attached to each other. It is obvious, therefore, that there is an unmet need in the art for a means to quickly and easily secure a golf-bag to a hand-cart without having to depend on twisting and folding straps and breakable buckles.

Another shortcoming of the hand-carts presently in use is experienced when a golfer places the golf cart with its attached golf-bag in a rest position at a particular hole. In order for this type of cart and bag to be stable while standing upright, the cart and bag must be placed in a position that results in the bag and cart being at some angle less than ninety degrees to the ground surface. This means that the golf clubs in the golf-bag must lean one upon another making underlying clubs difficult to identify and to retrieve. There are some golf-bag carts that hold the golf-bag is a more vertical position, but these bags are structurally unstable and likely to fall over. Thus, clearly, there is a need for a transporting hand-cart and golf-bag assembly that can maintain a stable, vertical, resting position so that a golfer can easily identify the required club and easily retrieve it from the golf-bag without having to "dig in" under the overlying clubs and having to bend over to one side or another.

Many of the golf-bag transport hand-carts in use today have frames that are bulky and heavy. Additionally, these frames cannot be easily and rapidly folded or opened for transport to and from the golf course. Moreover, the frames of the carts in use today were not designed to conform to shape of the golf-bag. Many of today's golf-bags are fitted with front, side, and rear pockets for holding golf related accessories. On many of today's carts the rear pockets are pressed against the frame of the cart making it difficult to access items in the rear pockets. Thus, there is a yet unmet need for a golf club bag transporting hand-cart that is lightweight and durable, is designed to conform to the shape of today's golf-bags, provides for easy and rapid folding and unfolding of the cart, is compact enough when folded to fit into most any storage and transport spaces, and allows for simple construction at minimal cost.

Some wheeled golf club transport hand-carts have their wheels relatively close to one another to allow for compactness of the cart while in storage or transport. The short axle length, however, means that when such carts are being moved from one hole to another or while the bag and cart assembly are in a resting standing position, they are inherently unstable. Some carts are manufactured with wheels that can be set apart to provide for stability. While these carts allow for adjustment of the axle length to minimize the space required for storage, once the wheel axle is shortened (i.e., the axle is in its retracted state) the cart's wheels are rendered immobile. This means that in order for the cart and bag to be transported through a door or gate having an opening narrower that the width of the bag and cart assembly when the wheel axle is retracted, the bag and cart must be lifted and carried through the opening. This can be difficult for most and impossible for some. Clearly, it would be a distinct advantage to have a cart with wheels that are functional in both a spaced apart and a retracted position to provide for the added feature of being able to wheel the cart with bag mounted through a narrow opening such as a doorway or gate.

Many golfers, over time, develop a fondness for a particular golf-bag and, even while they wish to increase the capabilities of their golfing equipment in general; they are unwilling to replace their favored golf-bag with another bag. Other golfers, especially beginners who already have made an initial investment in a golf-bag, may not be in the financial position to purchase a second bag, even one with a corresponding transport cart assembly that offered the solution to the long felt needs, as discussed above. So, it is clear that there is a need for a way to retrofit an existing golf-bag to a transport cart that is stable in a vertical at-rest position and while in transport around the golf course, has a lightweight frame that conforms to the shape of golf-bags with rear pockets, is durable, has retractable telescoping wheels, is able to be folded compactly for transport and storage, and yet is affordable.

Thus it is clear that what is sorely lacking in the art is a golf-bag transport hand-cart that provides solutions to the problems present in the carts that are currently available. The invention described hereinafter provides for all of these, heretofore, unmet needs.

SUMMARY

The present invention satisfies the urgent need in the art by providing for a mobile golf-bag and transport hand-cart having the means for a golfer to quickly and easily secure the golf-bag to the hand-cart without having to depend on twisting and folding straps and breakable buckles. Furthermore, the golf-bag/cart assembly, as taught herein, discloses a hand-cart assembly that allows the cart and the bag to stand stably in a vertical position so that a golfer can easily identify and retrieve the required club from the golf-bag without having to bend over to one side or another. The invention as taught herein also provides for a hand-cart frame that is lightweight and durable, conforms to the shape of today's golf-bags, is easily and rapidly folded and unfolded, once folded the cart is compact enough to fit into most any storage and transport space, is simple in its construction, and can be produced affordably. The golf-bag/cart assembly of the present invention provides a distinct advantage in that the cart's wheels are functional in both a spaced apart and a retracted position to provide for the added feature of being able to easily wheel the cart with bag mounted through a narrow opening such as a doorway or gate. The present invention additionally makes available the means to retrofit an existing golf-bag to a golf-bag transport cart of this invention, i.e., one that allows the bag and cart to remain stable in a vertical at-rest position as well as when the cart and bag are being transported around the golf course, one that has a lightweight frame that conforms to the shape of golf-bags with rear pockets, is durable, has retractable telescoping wheels, is able to be folded compactly for transport and storage, and yet is durable and affordable.

The present invention accomplishes the above stated benefits by providing for a foldable golf-bag transporting hand-cart/golf-bag assembly, comprising:

a) a golf-bag;
b) a foldable golf cart, and
c) mounting means for reversibly mounting the golf-bag on the golf cart providing for the golf bag to be maintained in a stable vertical position while in a rest position without the need for mounting straps, mounting biasing members, or moveable parts that can break or become worn with use.

The foldable golf-bag transporting hand-cart/golf-bag assembly further comprises:

a) a golf-bag having an outer surface, the outer surface having an upper and a lower region;
b) a first mounting member shaped in a sliding dovetail manner fixedly attached to the upper region of the golf-bag outer surface;
c) a third mounting member fixedly attached to the lower region of the golf-bag;
d) a foldable golf cart having a main frame having an upper and a lower end;
e) a second mounting member shaped in a sliding dovetail manner complementary to the dovetail shape of the first mounting member, where the second mounting member is fixedly attached to the upper end of the golf cart main frame, and
f) a fourth mounting member fixedly attached to the lower end of the golf cart main frame,
wherein the first mounting member engages with second mounting member in sliding dovetail fashion, and
wherein the third mounting means is adapted to engage with fourth mounting member providing for securely reversibly mounting the golf-bag on the golf cart to maintain a stable vertical position in a rest position without, a need for mounting straps, biasing mounting members, or moving parts that can wear out or break creating a need for repair or replacement.

The foldable hand-cart/golf-bag yet further comprises a foldable handle rotably attached to the upper end of the main frame of the golf cart, whereby the handle may be opened for use or may be folded.

The cart/bag assembly also provides for a foldable platform that is rotably attached to the lower end of the main frame of the golf cart, whereby the platform may be open to a horizontal position to provide support for the golf-bag or the platform may be folded for storage. The platform further comprises an underside with a leg member mounted to the underside, wherein the leg member supports the platform in a horizontal position ensuring that while in a resting position, the golf bag, mounted on the platform of the golf cart, is maintained in a vertical position.

The foldable hand-cart/golf-bag still further comprises:

a) the golf-bag having an upper outer surface;
b) the first mounting member having a shaped protrusion, and
c) the second mounting member having a recess shaped to accept the shaped protrusion of the first mounting member,
whereby the first mounting member is reversibly mountable onto the second mounting member, and
d) a base on the golf-bag;
e) the third mounting member having a shaped recess, where the third mounting member is fixedly attached to the base of the golf-bag, and
f) a shaped protrusion on the fourth mounting member, with the fourth mounting member fixedly attached to the platform of the lower end of the main frame of the golf cart where the shaped protrusion is adapted to fit into the shaped recess of the third mounting member, whereby the third mounting member is reversibly mountable onto the fourth mounting member.

The foldable hand-cart/golf-bag additionally comprises:
a) a retractable telescoping wheel axle rotably attached to the lower end of the main frame, and
b) wheels attached to the wheel axel providing mobility to the cart,
wherein the wheels with the axle may be telescoped outwardly to a fully open position providing stability to the bag/cart assembly in motion or in a vertical rest position, or
wherein the wheels and the axle may be retracted inwardly to a fully closed position providing for the bag/cart assembly to be wheeled through narrow passageways.

The foldable hand-cart/golf-bag further comprises a golf-bag having a main body that has an outer surface, and additionally where the golf-bag has compartments on the outer surface of the main body; and where the main frame of the golf cart is shape adapted to accept the bag with its bulky compartments, whereby the compartments are easily accessed.

The foldable hand-cart/golf-bag further comprises at least one spreader brace having a first end and a second end; wherein the first end of the spreader brace is rotably attached to the upper end of the main frame of the cart and the second end of the spreader brace is rotably attached to the foldable handle; whereby the spreader brace locks the foldable handle in an open position.

Still other benefits and advantages of this invention will become apparent to those skilled in the art upon reading and understanding the following detailed specification and related drawings.

BRIEF DESCRIPTION OF THE DRAWINGS

In order that these and other objects, features, and advantages of the present invention, may be more fully comprehended, the invention will now be described, by way of example, with reference to the accompanying drawings, wherein like reference characters indicate like parts throughout the several figures, and in which.

A LIST OF THE REFERENCE NUMBERS AND RELATED PARTS OF THE INVENTION

Figure 1:
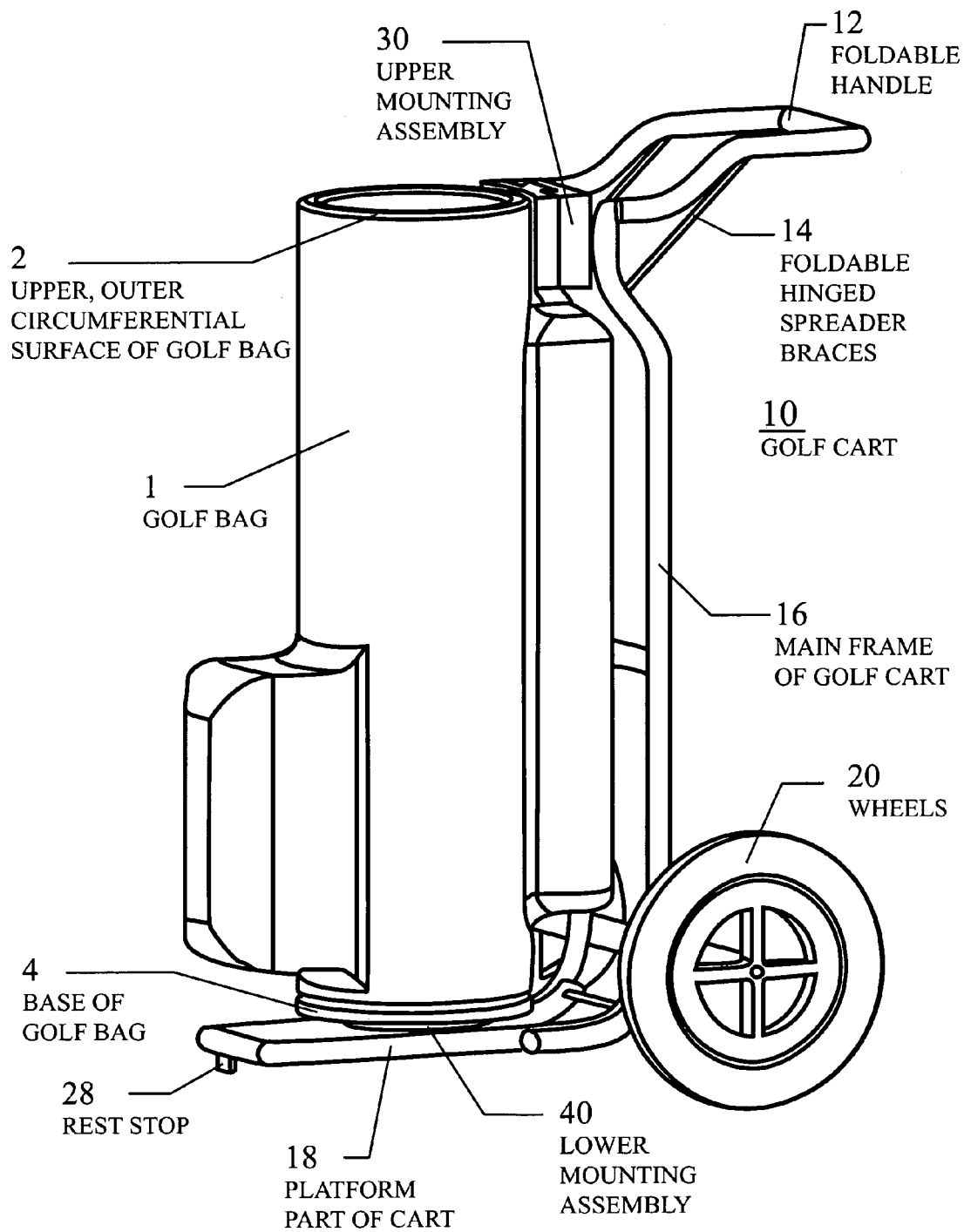
FIG. 1 is a perspective view of the golf-bag affixed to the golf-bag transport hand-cart by upper and lower mounting assemblies according to this invention.

1 Golf-bag
2 Upper, outer surface of golf-bag 1
4 Base component of golf-bag 1
10 Golf Cart
12 Foldable handle of golf cart 10
14 Foldable hinged spreader braces of golf cart 10
16 Main frame of golf cart 10
16a Curve of main frame 16 imparting concave outwards shape to frame 16 to accommodate bulging rear pockets of golf-bag 1
16b Curved supporting part of main frame of golf cart 10
18 Platform part of golf cart
20 Wheels of golf cart
22 Telescoping wheel axle
28 Rest stop or leg member of platform 18
30 Upper mounting assembly
32 Cart mounted member of upper mounting assembly 30
32a Sliding dovetail wedge-shaped recess of mounting member 32
34 Golf-bag mounted member of upper mounting assembly 30
34a Sliding dovetail wedge-shaped protrusion of upper mounting assembly 34
40 Lower mounting assembly
42 Cart mounted member of lower mounting assembly 40
44 Golf-bag mounted member of lower mounting assembly 40
46 Recess in golf-bag mounted member of lower mounting assembly 40

It should be understood that the drawings are not necessarily to scale. In certain instances, details which are not necessary for an understanding of the present invention or which render other details difficult to perceive may have been omitted. It should be understood, of course, that the invention is not limited to the particular embodiments illustrated herein, but encompasses many embodiments as are discussed throughout the specification.

DETAILED DESCRIPTION

Referring now particularly to the drawings, FIG. 1 illustrates a preferred embodiment of this invention and demonstrates how the above mentioned disadvantages have been overcome. It should be noted that the disclosed invention is disposed to many embodiments occurring in various sizes, shapes, and forms. Therefore, the exemplary embodiments described herein are provided with the understanding that the present disclosure is intended as illustrative and is not intended to limit the invention to the embodiments described herein.

More specifically, FIG. 1 illustrates as a preferred embodiment, a perspective view of golf-bag 1 affixed to golf-bag transport hand-cart 10. In particular, FIG. 1 shows golf-bag 1 detachably attached to golf-bag transport hand-cart 10 by means of upper mounting assembly 30 and lower mounting assembly 40. In brief, upper mounting assembly 30 (part of which is fixedly attached to circumferential upper outer surface of golf-bag 2 and part of which is attached to upper part of golf cart main frame 16, see below) and lower mounting assembly 40 (part of which is attached to the base of golf-bag 2 and part of which is attached to cart platform 18) free the bag/cart assembly from straps, biasing means, screws, or moving parts as a means of attaching the bag to the hand-cart.

The mounting assembly members, as illustrated in the figures, are fashioned from wood, however, the mounting assembly is easily and economically manufactured from lightweight aluminum or molded plastic, as desired. The mounting members may be purchased as an integral part of a bag/cart set, where the mounting members of the mounting assemblies have been fixedly attached to the golf-bag and cart in the assembly stage. Alternatively, if desired, the mounting assembly may be purchased as a separate unit to be retrofittedly affixed to a favored bag and/or cart.

As illustrated in FIG. 1, the golf-bag hand-cart assembly is ready for use. Foldable handle 12, hingedly attached to golf cart main frame 16, is shown in an unfolded position and is supported in that position by folding hinged spreader brace 14. One end of folding hinged spreader brace 14 is rotably attached to handle 12 and the other end of folding hinged spreader brace 14 is rotably attached to golf cart main frame 16. Golf cart main frame 16 is attached to telescoping wheels 30. Platform 18, hingedly attached to golf cart main frame 16, supports golf-bag 1, in the embodiment shown, by means of lower mounting assembly 40. Rest stop or leg member 28, fixedly attached to platform 18, ensures that platform 18 remains horizontal which maintains golf-bag 1 in a vertical position when in rest position and performs as a brake ensuring that the cart will not move on its own accord when at rest position on a sloped ground surface.

Figure 2A:
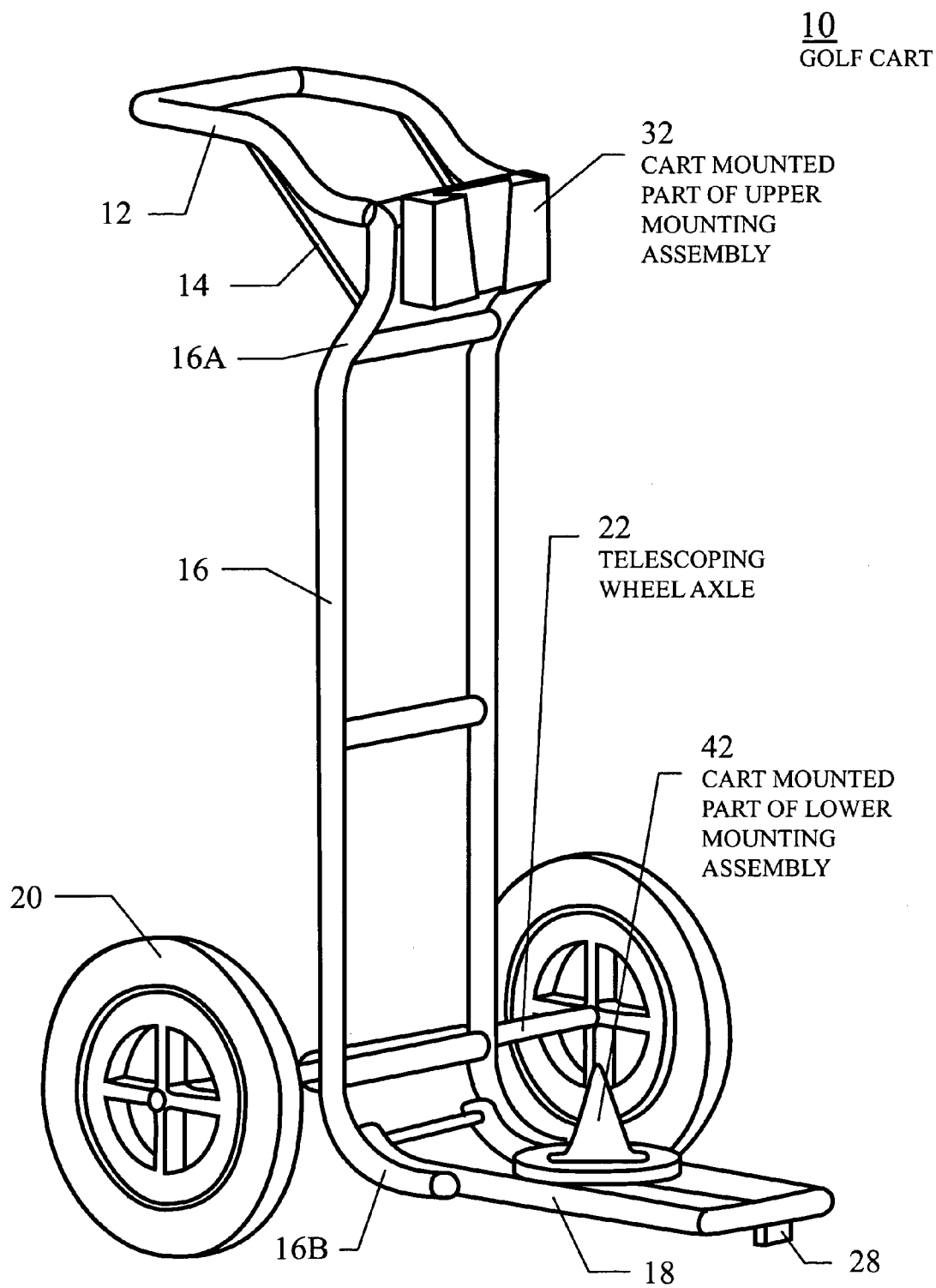
FIGS. 2a and 2b are perspective views of the golf-bag transport hand-cart as shown in FIG. 1 with golf-bag removed to illustrate the members of the upper and lower mounting assemblies that are affixed to the cart frame, one at the upper, handle end of the cart frame and the second or lower mounting member affixed to the platform part of the cart frame.
Figure 2B:
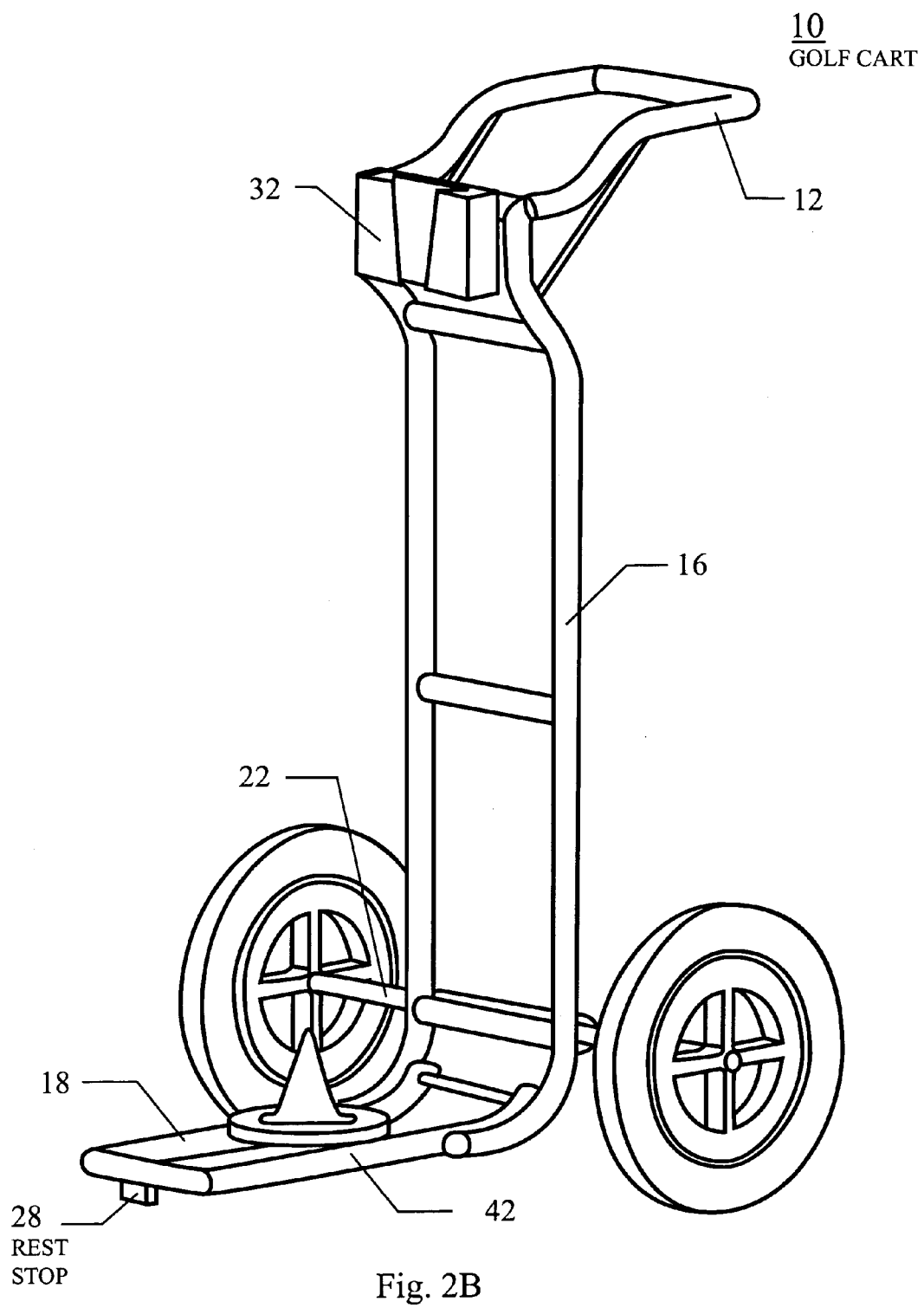

FIGS. 2a and 2b are perspective partial side views of golf-bag transport hand-cart 10 as shown in FIG. 1 with golf-bag 1 removed to illustrate those members of the upper and lower mounting assemblies that are affixed to the cart frame. As seen in FIG. 2a, upper mounting assembly member 32 is fixedly attached to the upper part (proximal to the attachment area of folding hand 12) of golf cart main frame 16 and lower mounting member 42 is fixedly attached to golf cart platform 18. Cart platform 18 is rotably attached to lower part 16b of main frame 16. FIG. 2a shows telescoping wheel axle 22 extended to full width positioning wheels 20 for optimal stability while the hand-cart is in motion or while the hand-cart is at rest.

FIGS. 2a and 2b show the concave outward curve 16a of main frame 16 allowing frame 16 to accommodate the rearwardly protruding rear accessory pockets of golf-bag 1. This design feature ensures that the back of the golf-bag will not be pressed against main frame 16, so that the rear accessory pockets are easily accessed even when the bag is firmly attached to the hand-cart. In the golf-bag hand-cart systems in use today, when the bag is positioned on the cart, the bag leans on the cart's main frame for support. Because the bag is leaning against the cart, the storage compartments located on the side of the bag that is facing the cart are inaccessible, at least until the bag is removed from the cart. The concave outward design of the main frame of the golf cart of the present invention allows easy access to the storage compartments located on the side of the bag that faces the main frame of the cart. In other words, the design of the cart provides extra space to allow for the presence of storage compartments, which means that the compartments are accessible even when the bag is firmly attached to the cart.

FIG. 2b illustrates rest stop 28 supporting platform 18 to provide for golf-bag 1 to be supported in a vertical position while the cart is at rest, as is shown in FIG. 1. Maintaining golf-bag 1 in a vertical position while the cart is at rest allows for easy identification of a desired golf club, as well as for easy removal of the identified club from the cart.

Figure 2C:
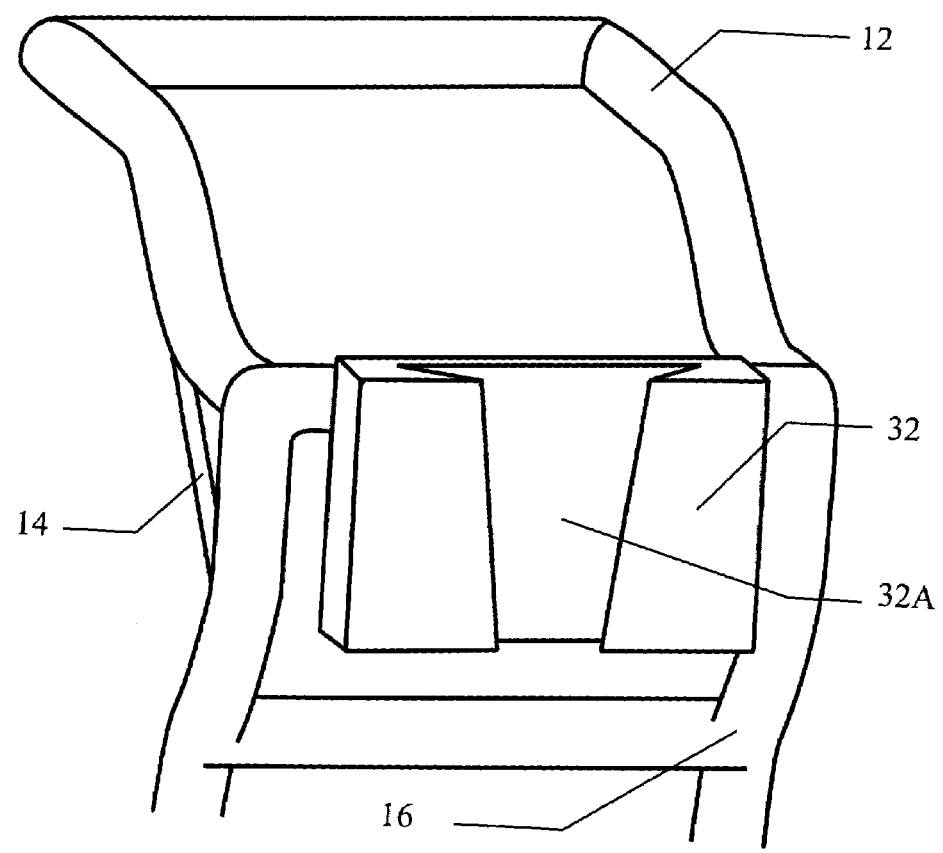
FIG. 2c is a close-up perspective view of the hand-cart as shown in FIG. 1 with golf-bag removed to illustrate the upper mounting assembly member that is affixed to the cart frame.

FIG. 2c is a close-up perspective view of upper mounting assembly member 32 fixedly attached to main frame 16 of cart 10. Also shown in FIG. 2 is wedge-shaped recess 32a of member 32.

Figure 2D:
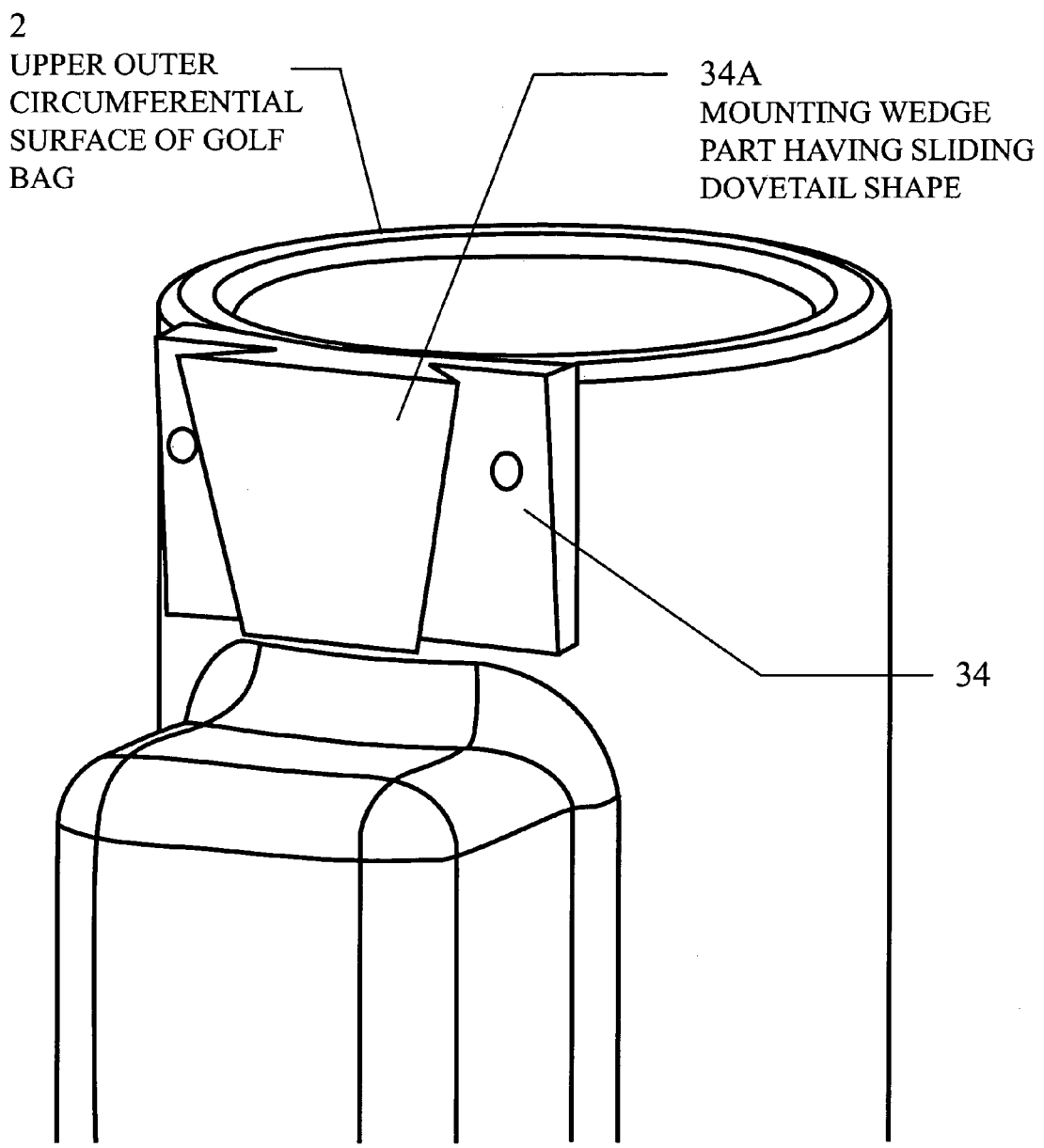
FIGS. 2d and 2e are close-up perspective views of the hand-cart as shown in FIG. 1 with golf-bag removed to illustrate the upper mounting assembly member that is affixed to the golf-bag.

FIG. 2d is a close-up sideward perspective view of upper mounting assembly member 34 fixedly attached to circumferential upper outer surface 2 of golf-bag 1. Formed integrally with upper mounting assembly member 34 is wedge-shaped coupling protrusion 34a. Coupling part 34a is formed complementary to recess part 32a which is shaped to provide for the reversible sliding dovetail joining of mounting member 32 with mounting member 34 (see also FIGS. 2d and 2e).

Figure 2E:
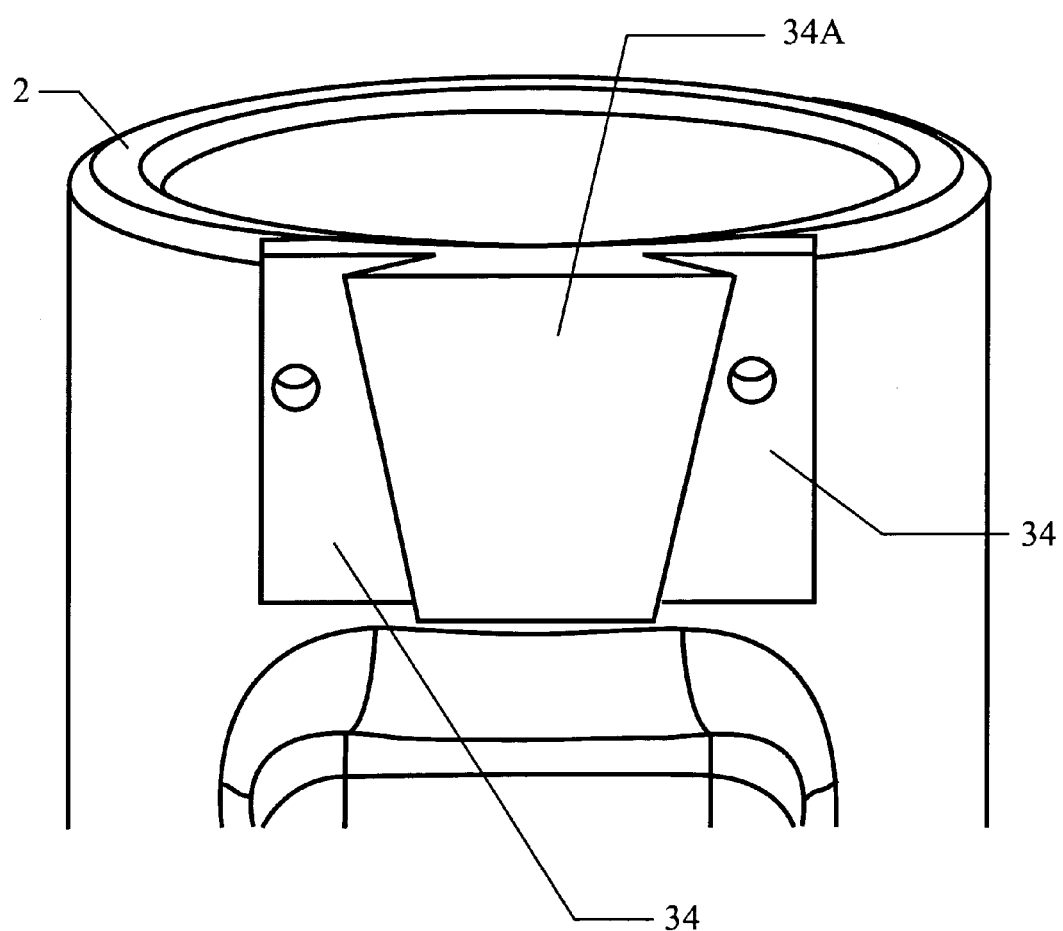

FIG. 2e is an exploded view better illustrate bag-affixed upper mounting assembly member 34 having wedge-shaped coupling protrusion 34a that is complementary to mounting recess 32a of cart-affixed upper mounting assembly member 32. When member 34 is mounted together with member 32 upper mounting assembly 30 is formed (see FIG. 1). The mounting assembly of this embodiment provides for easy and quick mounting of bag to cart resulting in a tight, secure bag-to-cart connection in one simple movement. Instead of threading and tightening mounting straps or having to adjust fittings or biasing means, the bag is lifted only a few inches so that the bag-affixed mounting members are aligned over the cart-affixed mounting members and the bag is then dropped into position. To remove the bag from the cart, the golfer need only lift the bag up a few inches and the bag is released. The invention, as taught, provides for a mounting procedure that is much less tedious than the systems presently available. The mounting procedure, of this invention, takes only seconds, as does the dismounting procedure. Once mounted the sliding dovetail connection of this embodiment assures that the bag is securely positioned on the cart until the golfer deliberately dismounts the bag. Another benefit of this mounting assembly is that no tools are required. Additionally, the mounting assembly as taught herein is free from the need for biasing or, otherwise, moving parts, thus significantly reducing the possibility of breakage and the need to replace or repair broken or worn parts. It is obvious, therefore, that the invention disclosed herein has responded to the heretofore unmet need in the art for means to quickly, easily, and reversibly secure a golf-bag to a hand-cart.

Figure 3:
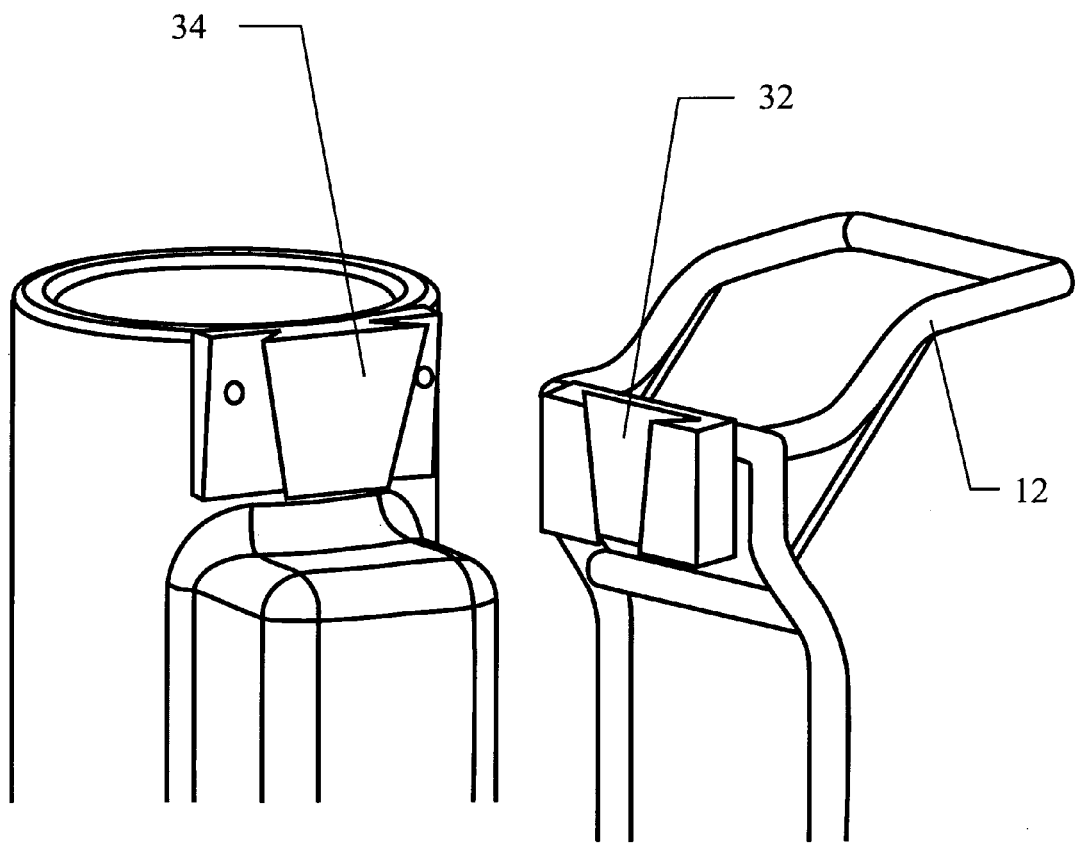
FIG. 3 is a close-up perspective view of the upper mounting member affixed to the golf-bag and the upper mounting member affixed to a varied style of the frame of the hand-cart to show the complementary sliding dove-tail design of the mounting members in position to be fitted together.

FIG. 3 is a close-up perspective view of upper mounting assembly member 34 affixed to a golf-bag and upper mounting assembly member 32 affixed to a varied style of the hand-cart frame, to better illustrate how member 32 is reversibly attached to member 34.

Figure 4:
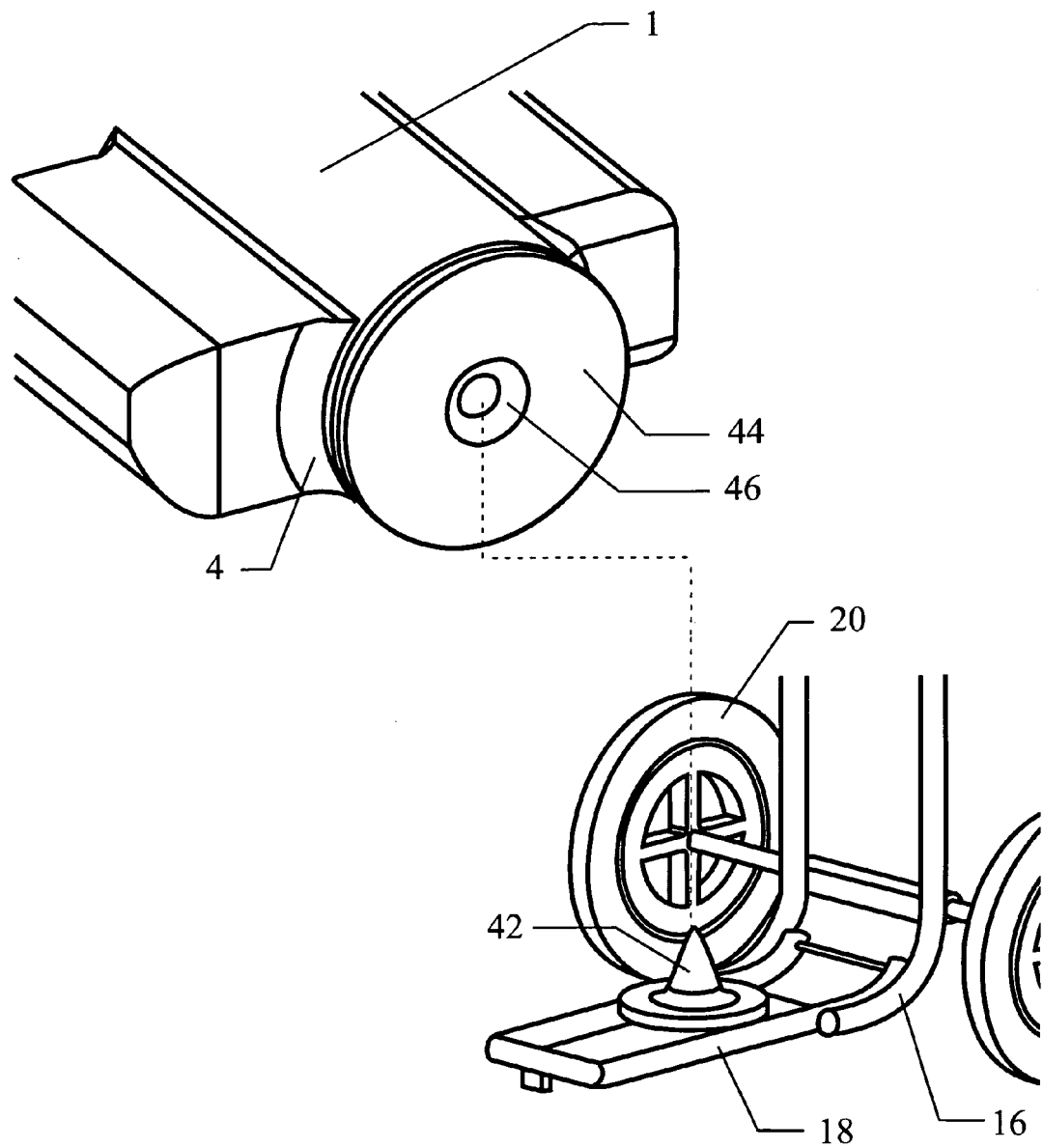
FIG. 4 is a perspective view of the bottom of the golf-bag separated from the golf cart to show the lower mounting assembly member affixed to the bottom of the golf-bag and having a mounting recess thereon into which fits the mating member of the lower mounting assembly member is affixed to the platform part of the cart frame.

FIG. 4 is a perspective view of the bottom of golf-bag 1 and lower mounting assembly member 44 mounted on platform 18 of cart 10 to illustrate the lower mounting assembly members of an embodiment as exemplified in the figures. Lower mounting assembly member 44 is shown affixed to base 4 of golf-bag 1 having mounting recess 46 shaped therein. Lower protrusion-like mounting assembly member 42 is shown affixed to platform part 18 of cart frame 16 to provide for reversibly coupling member 44 with member 42.

Figure 5:
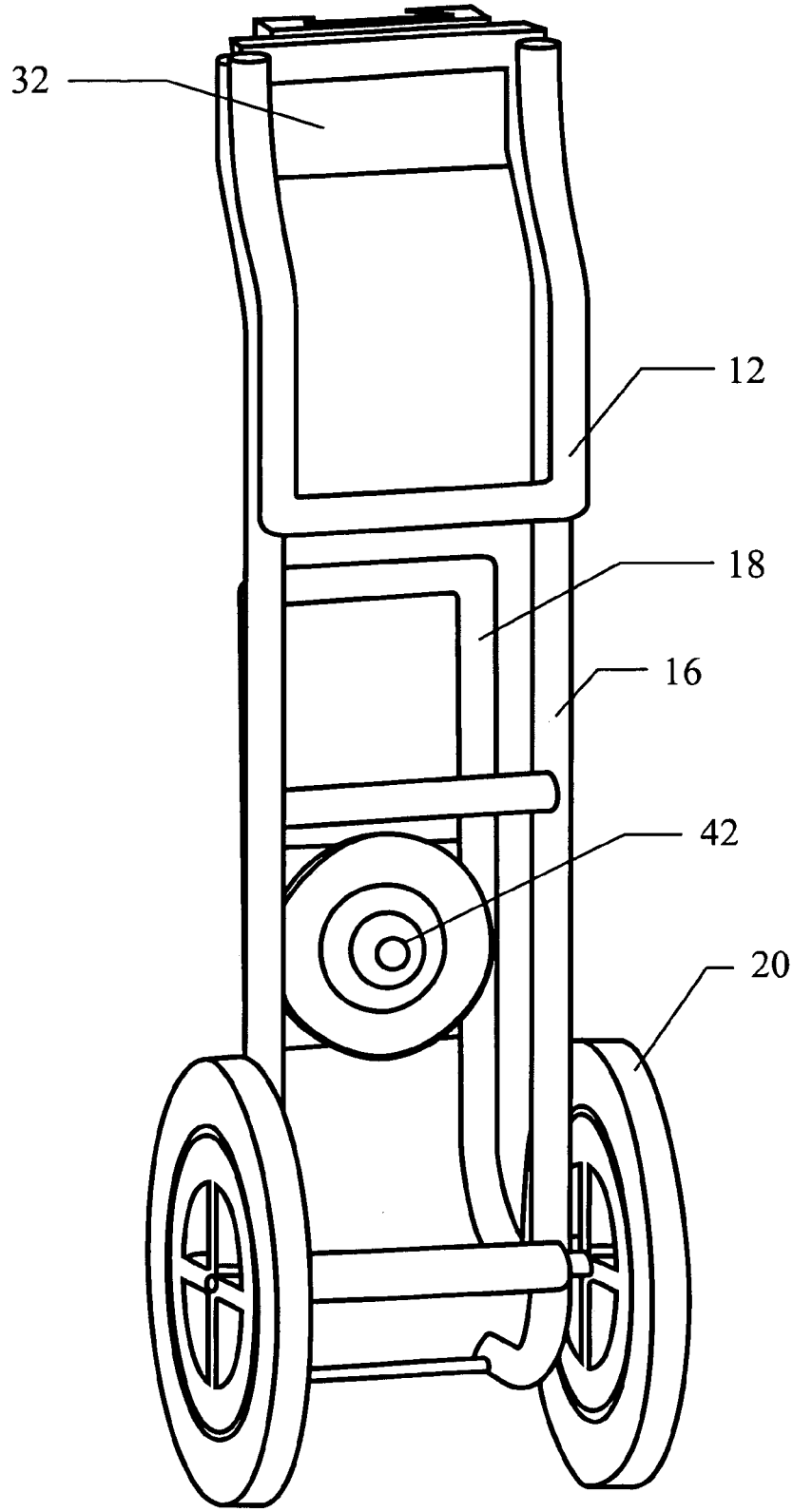
FIG. 5 is a perspective rear view of the cart as illustrated in FIG. 2 illustrating the handle and platform in their closed positions and the telescoping wheels retracted.

FIG. 5 is a perspective rear view of cart 10, as in FIG. 2, illustrating handle 12 and platform 18 in a folded positions and telescoping wheels 20 and axle 22 in a retracted position. As shown, cart 10 is sized to fit into most automobile trunks.

Figure 6:
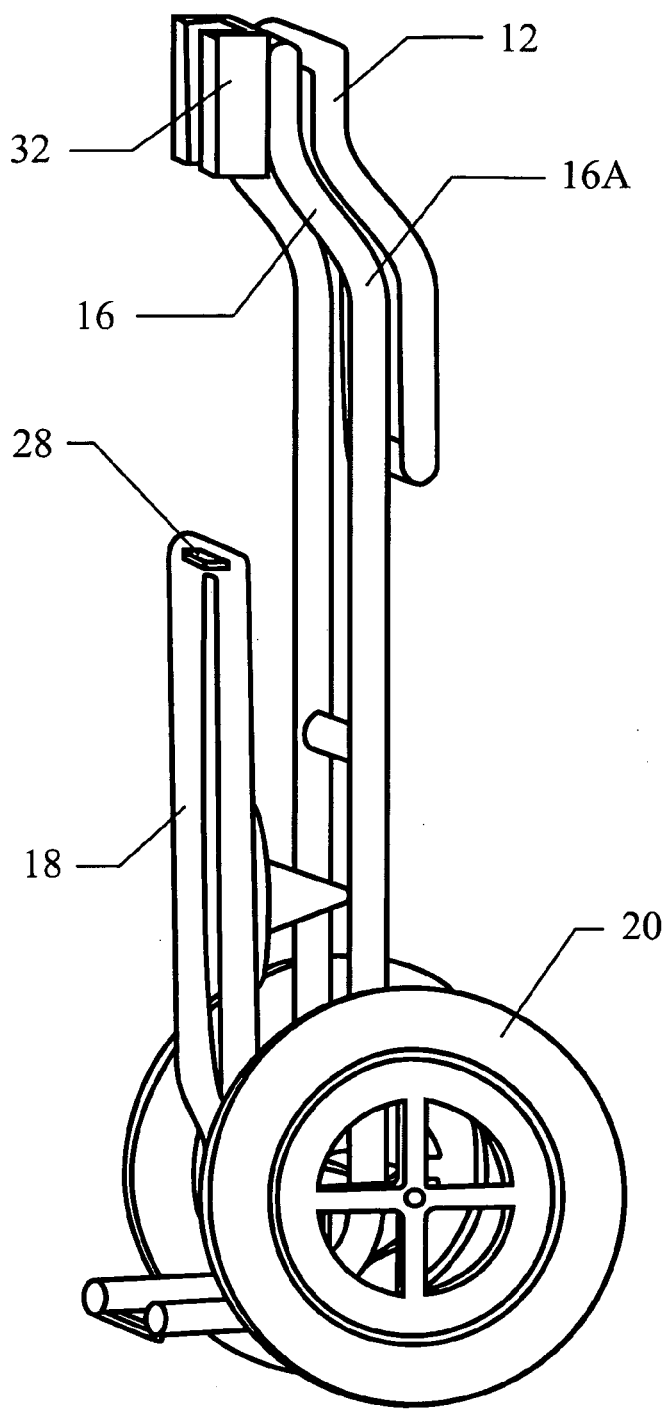
FIG. 6 is a perspective side view of the cart showing the handle, wheels, and platform in their closed positions as illustrated in FIG. 5.

FIG. 6 is a perspective side view of the cart showing the handle, wheels, and platform in their folded positions as illustrated in FIG. 5. It should be appreciated that in either the folded or unfolded positions, the hand-cart is stable in a vertical position. Additionally, in either the folded or unfolded positions, the wheels of the hand-cart are functional.

In the preferred embodiment illustrated in the figures, the golf cart transporting hand-cart is made of lightweight aluminum. It is also contemplated that the hand-cart can be made of any lightweight material such as plastic, fiberglass, or any other lightweight, durable material, such as a composite.

It is further contemplated that the mounting assemblies are made of materials other than wood as shown in the exemplary figures. The mounting assemblies can just as well be made of a molded plastic or other lightweight material.

To use the foldable golf-bag hand-cart assembly, one need simply lift the lightweight cart out of its storage compartment, such as the trunk of an automobile, place the wheels of the cart onto the surface of the ground, unfold the cart by pulling open the platform part and pushing it downwards toward the ground surface and pulling up on the handle in a direction away from the cart. Once the cart is opened, an action that takes less than a minute, the cart is ready to receive the golf-bag. To mount the bag, the bag need only be lifted a few inches with the rear of the bag facing the front of the cart. The mounting members of the bag are then lowered unto the mounting members of the cart to form a stable bag and cart assembly ready for easy transport about the greens of the golf bag on the cart.

With the telescoping wheels open to their full width, the cart is easy to push or pull. If a golfer should need to travel with bag and cart through a narrow passageway, the telescoping wheels can be placed in their retracted position to make the cart narrow enough to fit through the confined space. Retracting the wheels does not hamper the cart's mobility. In a rest position the bag stands in a vertical position making it easy for the golfer to search through the collection of the clubs in the bag to find the cub required for each shot and, additionally, permitting easy retrieval of any club from the bag.

The foregoing description, for purposes of explanation, used specific and defined nomenclature to provide a thorough understanding of the invention. However, it will be apparent to one skilled in the art that the specific details are not required in order to practice the invention. Thus, the foregoing descriptions of the specific embodiment of the novel foldable golf-bag hand-cart assembly having retrofit capability are presented for purposes of illustration and description. They are not intended to be exhaustive or to limit the invention to the precise forms disclosed. Those skilled in the art will recognize that many changes may be made to the features, such as adding an additional brake to the wheels, an umbrella holder, a drink holder, a soft gripper on the handle, and the like. Additional embodiments and other methods of making the embodiments of the invention described above may be made without departing from the spirit and scope of the invention. Furthermore, the present invention is not limited to the described methods, embodiments, features or combinations of features but include all the variation, methods, modifications, and combinations of features within the scope of the appended claims. The invention is limited only by the claims.

What is claimed is:

1. A foldable golf-bag transporting golf-cart/golf-bag assembly, comprising:
   a) a golf-bag having a base region and an outer surface, said outer surface having upper and lower regions;
   b) a first mounting member shaped in a sliding dovetail manner fixedly attached to said upper region of said outer surface of said golf-bag;
   c) a third mounting member fixedly attached to said base region of said golf-bag;
   d) a foldable golf-cart having a main frame, said main frame having an upper and a lower end;
   e) a second mounting member shaped in a sliding dovetail manner complementary to said first mounting member fixedly attached to said upper end of said golf-cart main frame;
   f) a fourth mounting member fixedly attached to said lower end of said golf-cart main frame;
   wherein said first mounting member engages with said second mounting member in sliding dovetail fashion, and
   wherein said third mounting member adapted for fitting engagement engages with said fourth mounting member;
   wherein said the engagement of the first and second members and the third and fourth mounting members provides for secure, reversible mounting said golf-bag on said golf-cart thus enabling said golf-bag to maintain a stable vertical position in a rest position free from the need for mounting straps or mounting biasing members.

2. The foldable golf-cart/golf-bag, as recited in claim 1, said golf-cart further comprising:
   a foldable handle rotably attached to said upper end of said main frame of said golf-cart,
   wherein said handle may be opened for use or may be folded.

3. The foldable golf-cart/golf-bag, as recited in claim 1, said golf-cart further comprising:
   a foldable platform rotably attached to said lower end of said main frame of said golf-cart,
   whereby said platform may be opened to a horizontal position to support said golf-bag in a vertical position when the golf-cart is at rest, or whereby said platform may be folded.

4. The foldable golf-cart/golf-bag, as recited in claim 1, further comprising:
   a) said third mounting member having a shaped recess, and
   b) said fourth mounting member having a shaped protrusion adapted to fit into said shaped recess of said third mounting member,
   whereby said third mounting member is reversibly mounted onto said fourth mounting member providing for secure, reversible mounting of said golf-bag on said golf-cart thus enabling said golf-bag to maintain a stable vertical position in a rest position free from the need for mounting straps or mounting biasing members.

5. The foldable golf-cart/golf-bag as recited in claim 1, wherein said golf-cart further comprises:

a) a retractable telescoping wheel axle rotably attached to said lower end of said main frame, and b) wheels attached to said wheel axle providing mobility to said cart, wherein said axle with said wheels may be telescoped outwardly to a fully open position providing stability to said bag/cart assembly in motion or in a vertical rest position, or wherein said axle and said wheels may be retracted inwardly to a fully closed position providing for said bag/cart assembly to be wheeled through narrow passageways.

6. The foldable golf-cart/golf-bag, as recited in claim 1, further comprising:

a) compartments on said outer surface of said golf-bag, and b) said main frame of said golf-cart shape-adapted to accept said bag having said compartments;

wherein said compartments are easily accessed when said bag having said compartments is mounted on said cart.

7. The foldable golf-cart/golf-bag, as recited in claim 3, wherein said platform further comprises:

a) an underside;

b) a leg member mounted to said underside;

wherein said leg member is adapted to rest on the ground surface when said platform is in an open, horizontal position supports said platform in a horizontal position ensuring the vertical at rest position of the golf-bag mounted on the golf-cart.

8. The foldable golf-cart/golf-bag, as recited in claim 2, further comprising:

a) at least one spreader brace having a first end and a second end;

wherein the first end of the spreader brace is rotably attached to the upper end of the main frame of the cart and the second end of the spreader brace is rotably attached to the foldable handle;

wherein the spreader brace may lock the foldable handle in an open position.

9. A mounting assembly for retrofitting a golf-bag and a golf-bag transporting golf-cart to form a golf-bag/golf-cart transporting assembly, comprising:

a) a first mounting member shaped in a sliding dovetail manner for affixable attachment to an upper end of a golf-bag;

b) a second mounting member shaped in a sliding dovetail manner complementary to said first mounting means affixable attachment to an upper end of a main frame of a golf-cart;

wherein said first mounting member is engagable with said second mounting member in sliding dovetail fashion, and c) a third mounting member having a shaped recess to be affixedly attached to a lower end of said golf-bag;

d) a fourth mounting member having a shaped protrusion adapted to fit into said shaped recess of said third mounting member affixedly attachable to a lower end of said main frame of said golf-cart;

wherein said third mounting member is reversibly mountable onto said fourth mounting member, e) said first mounting member and said second mounting member adapted to securely reversibly engage with each other, and f) said third mounting member and said fourth mounting member adapted to securely reversibly engage with each other, and g) said first mounting member reversibly mountable onto said second mounting member;

h) said third mounting member reversibly mountable onto said fourth mounting member, wherein the reversible mounting of the first and third mounting members onto the second and fourth members, respectively provides for secure, reversible mounting of said golf-bag on said golf-cart free from the need to use straps, a biasing mounting member, or moveable mounting parts.

\* \* \* \* \*

UNITED STATES PATENT AND TRADEMARK OFFICE
CERTIFICATE OF CORRECTION

| | | |
|---|---|---|
| PATENT NO. | : 7,004,482 B1 | Page 1 of 1 |
| APPLICATION NO. | : 10/614304 | |
| DATED | : February 28, 2006 | |
| INVENTOR(S) | : Steffan | |

It is certified that error appears in the above-identified patent and that said Letters Patent is hereby corrected as shown below:

On the Title Page please Delete Item (54) & Col. 1 Line 1-3 and Insert Item (54) & Col. 1 Line 1-3 --FOLDABLE GOLF-BAG/HAND CART ASSEMBLY WITH MOUNTING ASSEMBLY HAVING RETROFIT CAPABILITY--

Signed and Sealed this

Seventeenth Day of March, 2009

JOHN DOLL
*Acting Director of the United States Patent and Trademark Office*